(12) United States Patent
Venkatachalam (10) Patent No.: US 7,957,287 B2
(45) Date of Patent: Jun. 7, 2011

(54) BROADBAND WIRELESS ACCESS NETWORK AND METHOD FOR INTERNET PROTOCOL (IP) MULTICASTING

(75) Inventor: Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1332 days.

(21) Appl. No.: 11/464,449

(22) Filed: Aug. 14, 2006

(65) Prior Publication Data

US 2008/0037480 A1 Feb. 14, 2008

(51) Int. Cl.
*H04L 12/56* (2006.01)
(52) U.S. Cl. ........ 370/232; 370/390; 370/432; 370/217; 709/244; 709/249; 709/250
(58) Field of Classification Search .................. 370/217, 370/232, 390
See application file for complete search history.

(56) References Cited

U.S. PATENT DOCUMENTS

| | | | |
|---|---|---|---|
| 7,424,283 B1 | 9/2008 | Mangal | |
| 7,454,518 B1 * | 11/2008 | Cain et al. ..................... | 709/238 |
| 7,489,977 B2 | 2/2009 | Duffy et al. | |
| 2005/0010676 A1 | 1/2005 | Venkatachalam et al. | |
| 2005/0013280 A1 | 1/2005 | Buddhikot et al. | |
| 2005/0129020 A1 | 6/2005 | Doyle et al. | |
| 2005/0129054 A1 | 6/2005 | Venkatachalam et al. | |
| 2005/0149602 A1 | 7/2005 | Venkatachalam et al. | |
| 2006/0221978 A1 | 10/2006 | Venkatachalam | |
| 2006/0239265 A1 * | 10/2006 | Son et al. ..................... | 370/390 |
| 2007/0086434 A1 | 4/2007 | Venkatachalam et al. | |
| 2007/0087767 A1 | 4/2007 | Pareek et al. | |
| 2007/0097205 A1 | 5/2007 | Venkatachalam | |
| 2007/0099635 A1 | 5/2007 | Mohanty et al. | |
| 2007/0104129 A1 | 5/2007 | Yang et al. | |
| 2007/0104130 A1 | 5/2007 | Venkatachalam | |
| 2007/0104131 A1 | 5/2007 | Puthenkulam et al. | |
| 2007/0104132 A1 | 5/2007 | Rajagopalan et al. | |
| 2007/0104221 A1 | 5/2007 | Venkatachalam | |
| 2007/0105567 A1 | 5/2007 | Mohanty et al. | |
| 2007/0105600 A1 | 5/2007 | Mohanty et al. | |
| 2007/0121567 A1 | 5/2007 | Venkatachalam | |
| 2007/0133530 A1 | 6/2007 | Previdi et al. | |
| 2007/0191031 A1 | 8/2007 | Mohanty et al. | |
| 2007/0230326 A1 | 10/2007 | Pandoh et al. | |
| 2007/0245025 A1 | 10/2007 | Venkatachalam | |
| 2007/0253351 A1 | 11/2007 | Oswal | |
| 2007/0259692 A1 | 11/2007 | Venkatachalam | |
| 2007/0268863 A1 | 11/2007 | Venkatachalam | |
| 2007/0298806 A1 | 12/2007 | Venkatachalam | |
| 2008/0019312 A1 | 1/2008 | Venkatachalam et al. | |
| 2008/0056219 A1 | 3/2008 | Venkatachalam | |

OTHER PUBLICATIONS

"U.S. Appl. No. 11/468,210, Final Office Action mailed Jan. 28, 2010", 22 pgs.
"U.S. Appl. No. 11/468,210, Response filed Apr. 21, 2010 to Final Office Action mailed Jan. 28, 2010", 11 pgs.
"U.S. Appl. No. 11/468,210 Non Final Office Action Mailed Jul. 23, 2009", 22 pgs.
"U.S. Appl. No. 11/468,210, Response filed Oct. 7, 2009 to Non Final Office Action mailed Jul. 23, 2009", 12 pgs.

* cited by examiner

*Primary Examiner* — Charles N Appiah
*Assistant Examiner* — Randy Peaches
(74) *Attorney, Agent, or Firm* — Schwegman, Lundberg & Woessner, P.A.; Gregory J. Gorrie (57) ABSTRACT

Embodiments of a wireless access network and method for IP multicasting are generally described herein. Other embodiments may be described and claimed. In some embodiments, a serving base station receives a dynamic service addition request from a mobile station on a primary management connection identifier (CID) to join an existing multicast session, and the serving base station responsively establishing a multicast CID for use on a link between the mobile station and the serving base station.

7 Claims, 4 Drawing Sheets

BROADBAND WIRELESS ACCESS NETWORK AND METHOD FOR INTERNET PROTOCOL (IP) MULTICASTING

TECHNICAL FIELD

The present invention pertains to wireless communication systems. Some embodiments relate to broadcasting content in broadband wireless access (BWA) networks. Some embodiments relate to non-single-frequency network (SFN) operations. Some embodiments relate to internet protocol (IP) multicasting using an internet group management protocol (IGMP).

BACKGROUND

In some conventional wireless access networks, each base station independently communicates with associated mobile stations. Each mobile station generally communicates with one base station at a time and may receive broadcast content from that one base station.

One problem with these conventional networks is that is difficult for a mobile station to join a multicast session. Another problem with these conventional networks is that when a mobile station roams between base stations, a handover is performed. The handover may interrupt the flow of the broadcast content.

Thus, there are general needs for wireless access networks and methods that allow mobile stations to easily join multicast sessions and perform handovers among base stations without interrupting the flow of the broadcast content.

DETAILED DESCRIPTION

The following description and the drawings sufficiently illustrate specific embodiments of the invention to enable those skilled in the art to practice them. Other embodiments may incorporate structural, logical, electrical, process, and other changes. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
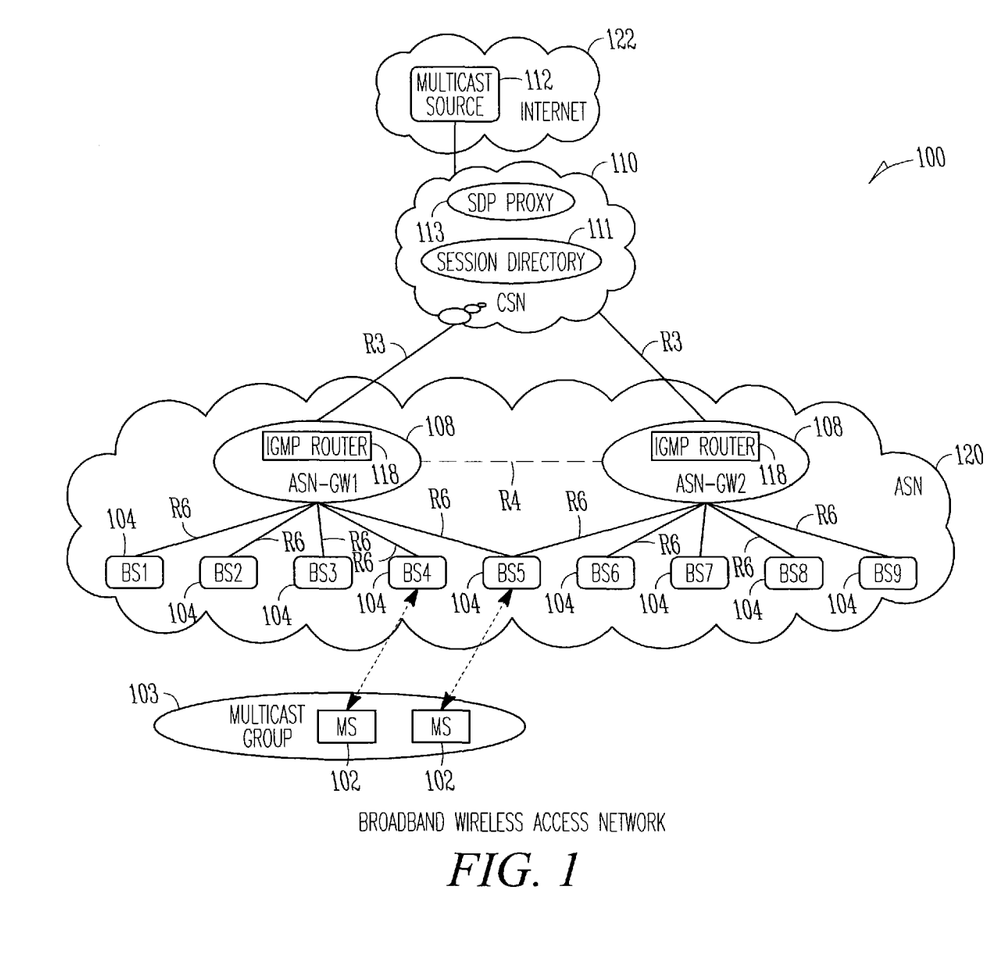
FIG. 1 illustrates a broadband wireless access network in accordance with some embodiments of the present invention.

FIG. 1 illustrates a broadband wireless access (BWA) network in accordance with some embodiments of the present invention. BWA network 100 comprises core service network (CSN) 110 and access service network (ASN) 120. Among other things, BWA network 100 may receive content from one or more content servers 112 and may provide the content to one or more mobile stations (MS) 102. ASN 120 may include one or more gateways (GW) 108, illustrated as ASN-GW 1 and ASN-GW 2, and a plurality of base stations 104, illustrated as BS1 through BS9. Gateways 108 may include routers 118 to route multicast packets to one or more base stations 104 based on routing tables. Routers 118 may be routers that implement an internet group management protocol (IGMP) and may be referred to as IGMP routers. Although routers 118 are shown as being located within gateways 108, this is not a requirement as routers 118 may be independent entities of ASN 120 or, for example, may be located within base stations 104.

In some embodiments, base stations 104 may be non-SFN base stations. In these embodiments, each base station 102 may operate independently from the other base stations 104 for multicast transmissions and there is no requirement for base stations 104 to synchronize the time and frequency of their multiple-access transmissions, as is the case in SFN operations.

CSN 110 may include multicast session directory 111 which may be stored on a directory server. Multicast session directory 111 may be used by mobile station 102 to determine the multicast IP address of a multicast session that mobile station 102 wishes to join. In some embodiments, ASN 120 may also include session description protocol (SDP) proxy 113. In these embodiments, mobile station 102 may use primitives of the SDP to contact SDP proxy 113 and browse the current contents of multicast session directory 111, although the scope of the invention is not limited in this respect. As illustrated in FIG. 1, multicast source 112 may be located within an external network, such as Internet 122, or within CSN 110.

In some embodiments, routers 118 may establish multicast groups, such as multicast group 103. A multicast group may include mobile stations 102 that have joined a multicast session. This is described in more detail below.

Base stations 104 may include one or more antennas for transmitting to mobile stations 102. The one or more antennas may comprise one or more directional or omnidirectional antennas, including, for example, dipole antennas, monopole antennas, patch antennas, loop antennas, microstrip antennas or other types of antennas suitable for transmission of RF signals. In some multiple-input, multiple-output (MIMO) embodiments, two or more antennas may be used. In some embodiments, instead of two or more antennas, a single antenna with multiple apertures may be used. In these embodiments, each aperture may be considered a separate antenna. In some embodiments, each antenna may be effectively separated to take advantage of spatial diversity and the different channel characteristics that may result between each of antennas and another wireless communication device.

As illustrated in FIG. 1, in some embodiments, ASN 120 may have an R3 interface with CSN 110, and gateways 108 may have an R4 interface therebetween. Gateways 108 may also have an R6 interface with each base station 104 as shown.

Figure 2:
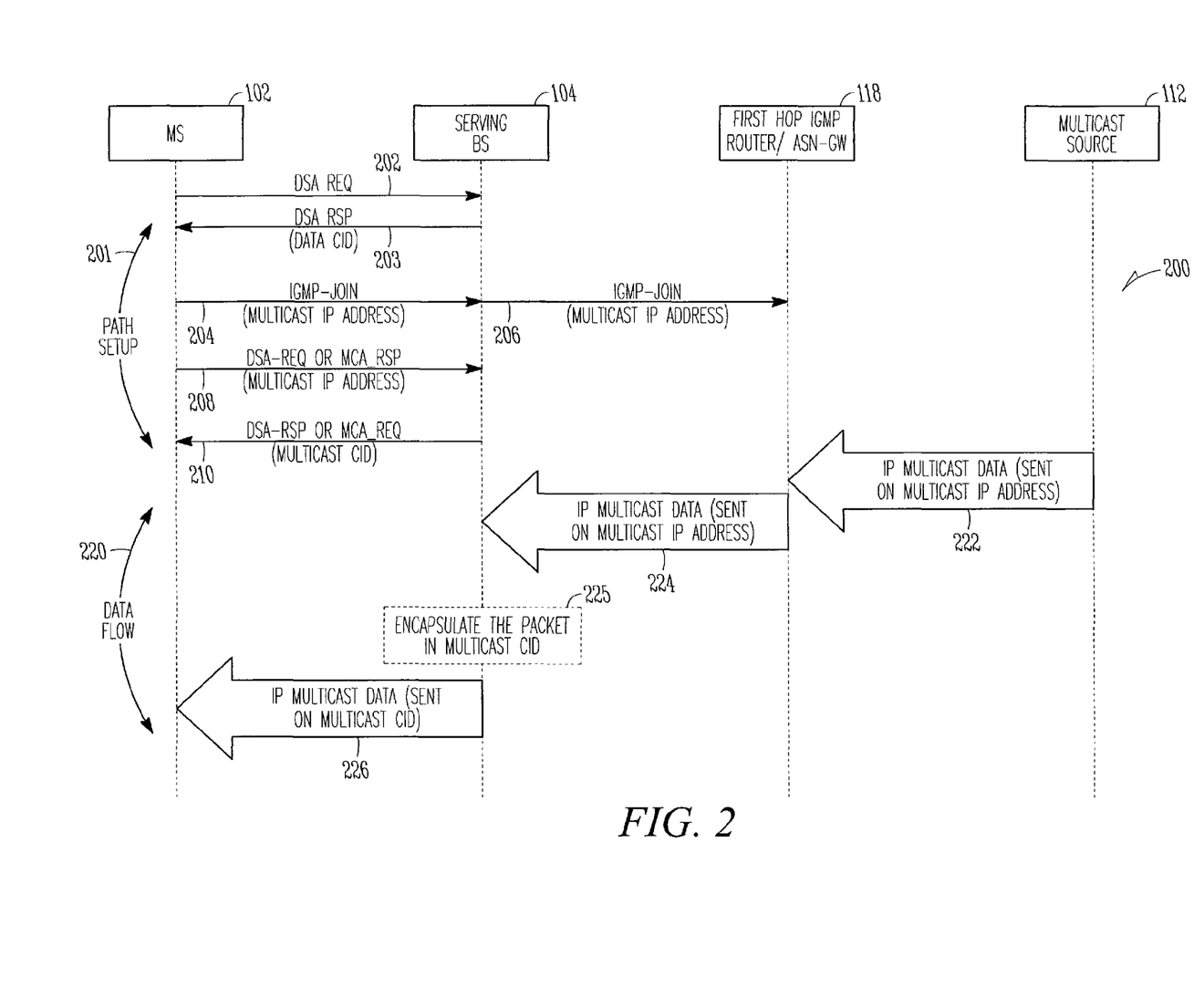
FIG. 2 is a procedure for joining an existing multicast session by a mobile station in accordance with some embodiments of the present invention.

FIG. 2 is a procedure for joining an existing multicast session by a mobile station in accordance with some embodiments of the present invention. Procedure 200 includes path setup portion 201 and data flow portion 220. In path setup portion 201, a data path is set up to allow mobile station (MS) 102 to receive multicast data 222 from multicast source 112 as described in more detail below. In data flow portion 220, multicast data 222 is routed through router 118 to serving base station 104 to mobile station 102 in accordance with path setup portion 201. In some embodiments, router 118 may be a first hop IGMP router within an ASN gateway. These embodiments are described in more detail below.

Mobile station 102 may send a dynamic service addition request message (DSA-REQ), such as DSA-REQ 202, to serving base station 104 to obtain a data connection identifier (CID) from serving base station 104. The data CID may be provided by base station 104 in a dynamic service addition response message (DSA-RSP), such as DSA-RSP 203. Messages 202 and 203 are an optional part of procedure 200 and may be performed when a mobile station does not already have a CID.

When mobile station 102 wishes to join an existing multicast session, mobile station 102 may send a request to join message, such as IGMP join message 204, requesting to join a multicast session. The request to join message may be received on an open data CID, such as the data CID discussed above, and the request to join message may include a multicast IP address of the existing multicast session or group mobile station 10 is requesting to join.

Prior to transmitting the request to join message, mobile station 102 may have been allowed to browse the contents of session directory 111 (FIG. 1) stored on a directory server within ASN 120 (FIG. 1) to determine the multicast IP address of the multicast session that mobile station 102 wishes to join for including in the request to join message. Multicast session directory 111 (FIG. 1) may list multicast sessions that are currently 'ON' in Internet 122 and/or that may be scheduled for future transmission.

When serving base station 104 doesn't have IGMP router functionality, message 204 may be blindly forwarded as IGMP join message 206 to an ASN gateway which may have IGMP router functionality. When serving base station 104 does have IGMP router functionality, it may perform the operations of an IGMP router.

At serving base station 104, a dynamic service addition request message, such as DSA-REQ message 208 may be received from mobile station 102 on a primary management CID. The dynamic service addition request message indicates to serving base station 104 that mobile station 102 is requesting a multicast CID. In response, serving base station 104 may establish a multicast CID for use on the airlink between mobile station 102 and serving base station 104. The multicast CID, previously sent by mobile station 102, may be used for mapping packets of the existing multicast session to the multicast IP address to mobile station 102. In these embodiments, DSA-REQ message 208 is used for obtaining a multicast CID, rather than a unicast CID. The multicast CID may be provided to mobile station 102 in response message 210, which may be a DSA-RSP message or a multicast allocation response (MCA-RSP) message.

After receipt of message 206 by router 118, IP multicast data 222, which may be sent on a multicast IP address from multicast source 112, may be routed by router 118 to serving base station 104 as IP multicast data 224. Serving base station 104, in operation 225, may encapsulate the packets in the multicast CID established above for transmission to mobile station 102 as IP multicast data 226. In some embodiments, IP multicast data 226 may be transmitted to one or more mobile stations that are part of the current multicast session. These mobile stations may be associated to the same base station or may be associated with different base stations.

In some embodiments, the multicast CID may be created as a new multicast CID when mobile station 102 is a first mobile station served by serving base station 104 requesting to join the multicast session. In these embodiments, serving base station 104 may refrain from creating a new multicast CID for use in mapping packets to the multicast IP address when one or more other mobile stations currently being served by serving base station 104 are part of the multicast session. In these embodiments, serving base station 104 may provide an existing multicast CID to mobile station 102 within response message 210.

Figure 3:
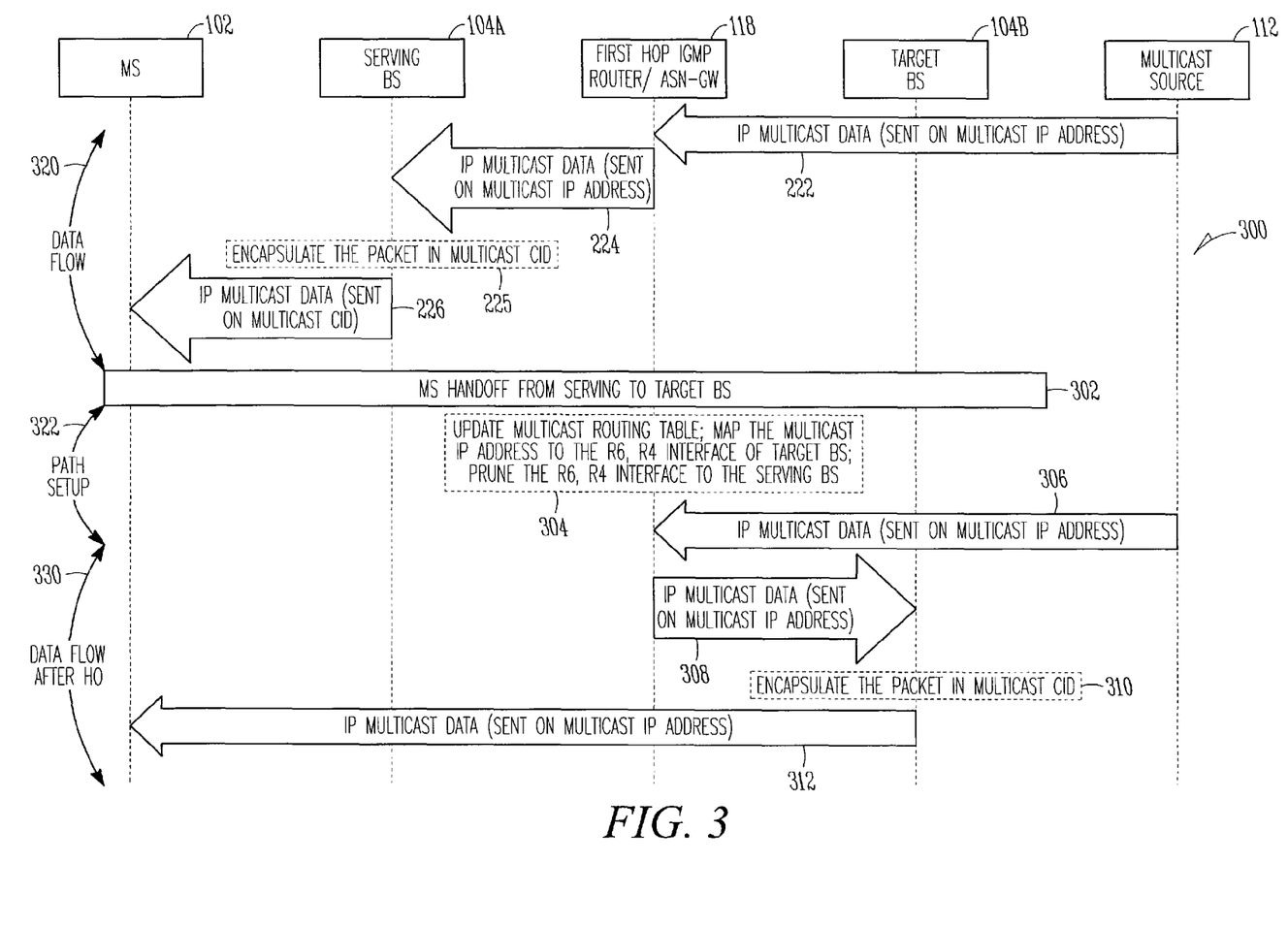
FIG. 3 is a procedure for handovers between base stations without an IP address change in accordance with some embodiments of the present invention.

FIG. 3 is a procedure for handovers between base stations without an IP address change in accordance with some embodiments of the present invention. Procedure 300 includes data flow portion 320 prior to handover, path setup portion 322, and data flow portion 330. Data flow portion 320 corresponds to data flow portion 220 (FIG. 2). Path setup portion 322 may be performed as part of a handover procedure to handover mobile station 102 from serving base station 104A to target base station 104B as described in more detail below. Data flow portion 330 is performed after handover (HO). In data flow portion 330, multicast data 306 is routed from router 118 through target base station 104B to mobile station 102 as described in more detail below.

During data flow portion 320, mobile station 102 may continue to receive IP multicast data 226 sent on a multicast CID as discussed above. In operation 302, a handover procedure may be initiated by either mobile station 102 or serving base station 104A. The handover procedure may include the initiating party sending a handover request and the other party responding with a handover response. As part of operation 302, a target base station, such as target base station 104B, is identified.

As part of the handover procedure, operation 304 is performed. In operation 304, router 118 may add or update an entry in its multicast routing table so that packets having the IP multicast address of the current IP multicast session associated with serving base station 104A, are subsequently also routed to the IP address (e.g., the R6 interface) of target base station 104B.

In addition, router 118 may check if there are any other mobile stations that are currently receiving packets of the IP multicast session after the handover of mobile station 102. In some embodiments, router 118 may send a query message, such as an IGMP query message, to each mobile station associated with serving base station 104A. Mobile stations currently receiving the IP multicast session may respond with an IGMP report message. When router 118 receives any IGMP report messages from mobile stations currently receiving the IP multicast session, it may refrain from making further changes to its routing table. When router 118 does not receive any IGMP report messages from mobile stations, an entry may be removed from its routing table so that packets having the IP multicast address of the current IP multicast session will no longer be routed to serving base station 104A. In other words, the R6 interface of serving base station 104A may be pruned.

After the completion of operation 304, IP multicast data 306 of the current IP multicast session may be routed from router 118 to target base station 104B as IP multicast data 308. In operation 310, target base station 104B may encapsulate the IP multicast data with the same multicast CID as IP multicast data 226. Accordingly, encapsulated IP multicast data 312 may be received by mobile station 102.

Figure 4:
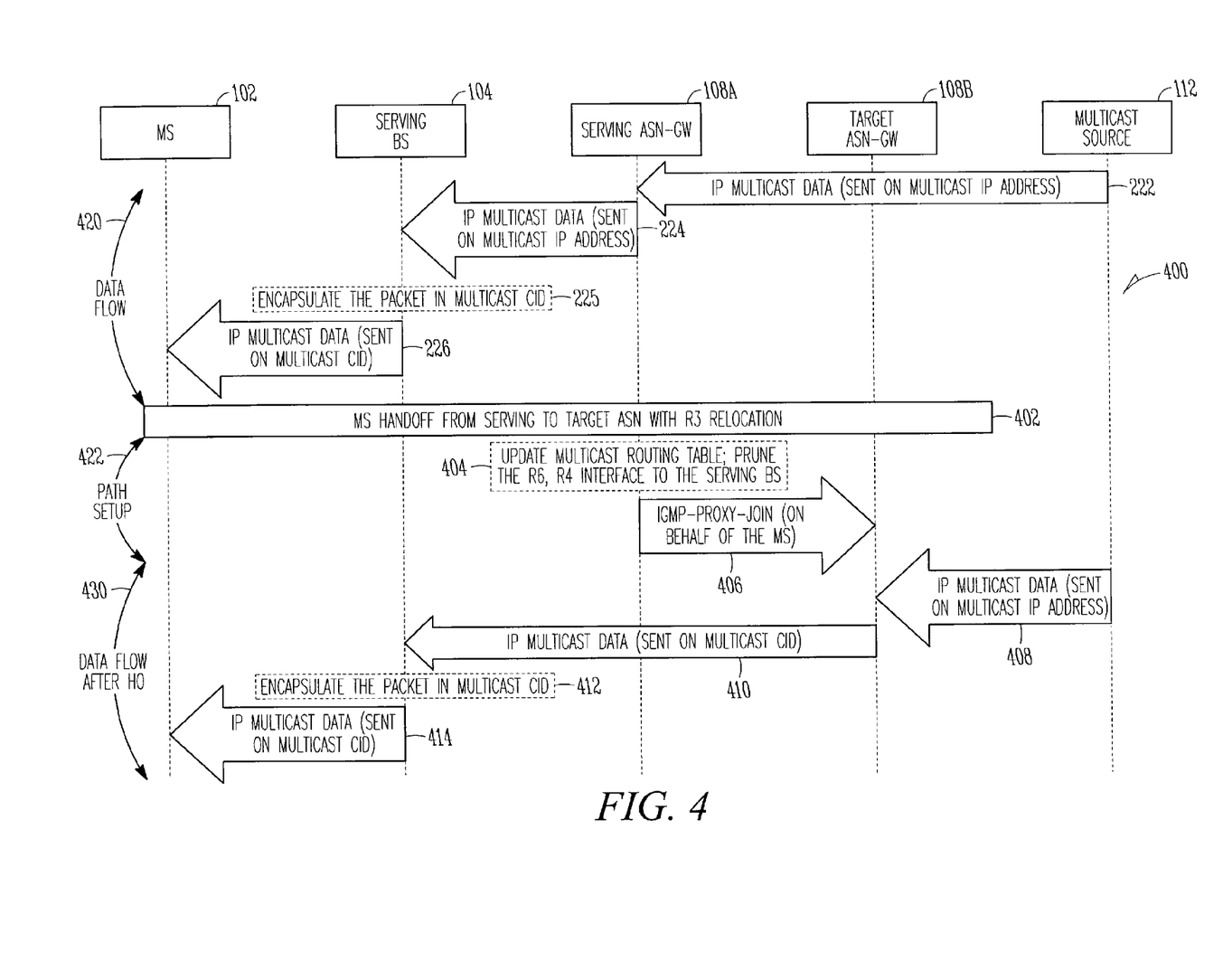
FIG. 4 is a procedure for handovers between gateways within an access service network with an IP address change in accordance with some embodiments of the present invention.

FIG. 4 is a procedure for handovers between gateways of an ASN with an IP address change in accordance with some embodiments of the present invention. Procedure 400 includes data flow portion 420 prior to handover, path setup portion 422, and data flow portion 430. Data flow portion 420 corresponds to data flow portion 220 (FIG. 2). Path setup portion 422 may be performed as part of a handover procedure to handover mobile station 102 from serving gateway 108A to target gateway 108B as described in more detail below. In data flow portion 430, multicast data 408 is routed through target gateway 108A through serving base station 104 to mobile station 102 after a layer three address change as described in more detail below.

In operation 402, a handover procedure is performed to handover mobile station 102 from serving gateway 108A to target gateway 108B. Serving gateway 108A and target gateway 108B may be gateways within the same ASN, such as ASN 120 (FIG. 1), while in other embodiments, serving gateway 108A and target gateway 108B may be gateways of different ASNs. Prior to operation 402, a layer two (L2) handover procedure may have been performed to handover mobile station 102 from an initial base station under serving gateway 108A to a current base station under target gateway 108B. As a result of this layer two handover procedure, multicast packets may be routed from multicast source 112 to serving gateway 108A to target gateway 108B to a current base station (illustrated as serving base station 104 in FIG. 4) and to mobile station 102. Accordingly, path setup portion 422 may include a layer three handover procedure to allow the multicast packets to flow from multicast source 112 to target gateway 108B to serving base station 104 and to mobile station 102.

In operation 404, the multicast routing table of an IGMP router associated with target gateway 108B is updated allowing gateway 108B to become the serving gateway. In some embodiments, this is achieved by sending IGMP-proxy-join message 406 by serving gateway 108A to target gateway 108B. The multicast routing table of the IGMP router associated with serving gateway 108A may be pruned to remove routing of the IP multicast session for mobile station 102 so that gateway 108A is no longer the serving gateway. Pruning the IP multicast session is performed at serving gateway 108A (i.e., the prior serving gateway) in the event that there are no other mobile stations listening to the IP multicast session through any of the base stations associated with prior serving gateway 108A. Prior to pruning, the router may use query and response messages as discussed above to determine if there are mobile stations receiving the IP multicast session. In these embodiments, no interface updates are needed for serving base station 104 because base station 104 will continue to receive IP multicast data 410 with the same multicast CID as IP multicast data 224 prior to the handover. In these embodiments, no interface updates are needed for mobile station 102 because mobile station 102 will continue to receive IP multicast data 414 with the same multicast CID as IP multicast data 224 prior to the handover. As illustrated in data flow portion 430, target gateway 108B (now the serving gateway) directly receives IP multicast data 408 from multicast source 112, and sends IP multicast data 410 on the multicast CID to serving base station 104. As part of operation 412, serving base station 104 may encapsulate the packets in the multicast CID for transmission to mobile station 102 as IP multicast data 412.

Referring to FIG. 1, in some embodiments, base stations 104 and mobile stations 102 may communicate orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. In some wireless access network embodiments, base stations 104 and mobile stations 102 may communicate in accordance with a multiple access technique, such as orthogonal frequency division multiple access (OFDMA), although the scope of the invention is not limited in this respect. In some embodiments, wireless access network 100 may comprise a Worldwide Interoperability for Microwave Access (WiMax) network, although the scope of the invention is not limited in this respect.

In some embodiments, mobile stations 102 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the frequency spectrums for the communication signals communicated by base stations 104 and mobile stations 102 may comprise either a 5 gigahertz (GHz) frequency spectrum or a 2.4 GHz frequency spectrum. In these embodiments, the 5 gigahertz (GHz) frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for the communication signals may comprise frequencies between 2 and 11 GHz, although the scope of the invention is not limited in this respect.

In some broadband wireless access network embodiments, base stations 104 and mobile stations 102 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware and software. Some embodiments of the invention may also be implemented as instructions stored on a computer-readable storage medium, which may be read and executed by at least one processor to perform the operations described herein. A computer-readable storage medium may include any mechanism for storing information in a form readable by a machine (e.g., a computer). For example, a computer-readable storage medium may include read-only memory (ROM), random-access memory (RAM), magnetic disk storage media, optical storage media, and flash-memory devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method of internet-protocol (IP) multicasting in a wireless access network comprising:
   receiving, at a serving base station, a join request from a mobile station to join an existing multicast session, the join request being received on an open data connection identifier (CID) and including a multicast IP address of the existing multicast session the mobile station is requesting to join;
   receiving, at the serving base station, a dynamic service addition (DSA) request from the mobile station on a primary management CID, the serving base station to responsively establish a multicast CID for use on a link between the mobile station and the serving base station;
   transmitting IP multicast data encapsulated with the multicast CID;
   creating the multicast CID when the mobile station is a first mobile station served by the serving base station requesting to join the multicast session, and refraining from creating the multicast CID as a new multicast CID when one or more other mobile stations are currently being served by the serving base station as part of the existing multicast session;
   forwarding, by the serving base station, the join request to a router within an access service network (ASN) when the serving base station does not have internet group management protocol functionality;
   receiving a handover request for handing over the mobile station from the serving base station to a target base station,
   wherein in response to the handover request, the method further comprises:
   updating a multicast routing table at the router to map the multicast IP address of the IP multicast data from an IP address of the serving base station to an IP address of the target base station;
   determining, by the router, if other mobile stations being served by serving base station are currently receiving the IP multicast data by sending query messages to the other mobile stations;
   removing an entry from the multicast routing table for the multicast IP address when no responses are received to the query messages; and
   refraining from removing the entry from the multicast routing table for the multicast IP address when at least one response is received from the query message indicating that at least one of the other mobile stations is receiving the IP multicast data from the serving base station.

2. A method of internet-protocol (IP) multicasting in a wireless access network comprising:
   receiving, at a serving base station, a join request from a mobile station to join an existing multicast session, the join request being received on an open data connection identifier (CID) and including a multicast IP address of the existing multicast session the mobile station is requesting to join;
   receiving, at the serving base station, a dynamic service addition (DSA) request from the mobile station on a primary management CID, the serving base station to responsively establish a multicast CID for use on a link between the mobile station and the serving base station;
   transmitting IP multicast data encapsulated with the multicast CID;
   creating the multicast CID when the mobile station is a first mobile station served by the serving base station requesting to join the multicast session, and refraining from creating the multicast CID as a new multicast CID when one or more other mobile stations are currently being served by the serving base station as part of the existing multicast session; and
   forwarding, by the serving base station, the join request to a router within an access service network (ASN) when the serving base station does not have internet group management protocol functionality,
   wherein in response to a handover request for handing over the mobile station received from the serving base station, the method comprises:
   handing over the mobile station from the serving base station to a target base station, the serving base station being associated with a serving gateway, the target base station being associated with a target gateway;
   initially routing the IP multicast data from the serving gateway to the target gateway after the handing over for transmission to the mobile station by the target base station;
   updating a multicast routing table of a router associated with the target gateway to route the IP multicast data received from a multicast source directly to the serving base station on the multicast CID; and
   removing an entry from a multicast routing table of a router associated with the serving gateway to prevent further routing of the IP multicast data from the multicast source to the target gateway.

3. The method of claim 2 wherein the ASN is a first ASN, wherein the serving gateway is located within the first ASN, and
   wherein the target gateway is located within a second ASN.

4. The method of claim 2 wherein the serving base station and the target base station operate independently and without time and frequency synchronized multiple access transmissions.

5. The method of claim 2 wherein transmissions by the serving base station and the target base station comprise time and frequency synchronized multiple access transmissions.

6. An access service network (ASN) comprising: a serving base station for internet-protocol (IP) multicasting to a mobile station; and a router for routing IP multicast data to one or more base stations of the ASN including the serving base station,
   wherein the serving base station receives a join request from the mobile station to join an existing multicast session, the join request being received on an open data connection identifier (CID) and including a multicast IP address of the existing multicast session the mobile station is requesting to join,
   wherein the serving base station further receives a dynamic service addition request from the mobile station on a primary management CID and responsively establishes a multicast CID for use on a link between the mobile station and the serving base station, wherein the serving base station transmits IP multicast data encapsulated with the multicast CID, wherein the serving base station creates the multicast CID when the mobile station is a first mobile station served by the serving base station requesting to join the multicast session, wherein the serving base station refrains from creating the multicast CID as a new multicast CID when one or more other mobile stations are currently being served by the serving base station as part of the existing multicast session, wherein the serving base station forwards the join request to the router when the serving base station does not have internet group management protocol functionality, and wherein when a handover request is received from the serving base station for handing over the mobile station from the serving base station to a target base station, the router updates a multicast routing table to map the multicast IP address of the IP multicast data from an IP address of the serving base station to an IP address of the target base station, determines if other mobile stations being served by serving base station are currently receiving the IP multicast data by sending query messages to the other mobile stations, removes an entry from the multicast routing table for the multicast IP address when no responses are received to the query messages, and refrains from removing the entry from the multicast routing table for the multicast IP address when at least one response is received from the query message indicating that at least one of the other mobile stations is receiving the IP multicast data from the serving base station.

7. An access service network (ASN) comprising: a serving base station for internet-protocol (IP) multicasting to a mobile station; and a router associated with a serving gateway for routing IP multicast data to one or more base stations of the ASN including the serving base station, wherein the serving base station receives a join request from the mobile station to join an existing multicast session, the join request being received on an open data connection identifier (CID) and including a multicast IP address of the existing multicast session the mobile station is requesting to join, wherein the serving base station further receives a dynamic service addition request from the mobile station on a primary management CID and responsively establishes a multicast CID for use on a link between the mobile station and the serving base station, wherein the serving base station transmits IP multicast data encapsulated with the multicast CID, wherein the serving base station creates the multicast CID when the mobile station is a first mobile station served by the serving base station requesting to join the multicast session, wherein the serving base station refrains from creating the multicast CID as a new multicast CID when one or more other mobile stations are currently being served by the serving base station as part of the existing multicast session, wherein the serving base station forwards the join request to the router when the serving base station does not have internet group management protocol functionality, and wherein in response to a handover request received from the serving base station for handing over the mobile station from the serving base station, the router associated with the serving gateway is configured to hand over the mobile station from the serving base station to a target base station, the serving base station being associated with the serving gateway, the target base station being associated with a target gateway, wherein the router associated with the serving gateway initially routes the IP multicast data from the serving gateway to the target gateway after the handing over for transmission to the mobile station by the target base station, wherein the network further comprises a router associated with the target gateway, wherein the router associated with the target gateway updates a multicast routing table to route the IP multicast data received from a multicast source directly to the serving base station on the multicast CID, and wherein the router associated with the serving gateway removes an entry from a multicast routing table to prevent further routing of the IP multicast data from the multicast source to the target gateway.

* * * * *

UNITED STATES PATENT AND TRADEMARK OFFICE
CERTIFICATE OF CORRECTION

| | | |
|---|---|---|
| PATENT NO. | : 7,957,287 B2 | |
| APPLICATION NO. | : 11/464449 | |
| DATED | : June 7, 2011 | |
| INVENTOR(S) | : Muthaiah Venkatachalam | |

It is certified that error appears in the above-identified patent and that said Letters Patent is hereby corrected as shown below:

On the title page, item (56), under "US Patent Documents", in column 2, line 5, delete "VenkatachaIam" and insert -- Venkatachalam --, therefor.

Signed and Sealed this
Second Day of August, 2011

David J. Kappos
*Director of the United States Patent and Trademark Office*